March 1, 1938.  A. P. PLAHN  2,109,596
LENS SYSTEM FOR COLOR PHOTOGRAPHY AND CINEMATOGRAPHY
Filed Aug. 10, 1936  2 Sheets-Sheet 1

August Persson Plahn
INVENTOR

Peter M. Boeing
ATTORNEY

March 1, 1938. A. P. PLAHN 2,109,596
LENS SYSTEM FOR COLOR PHOTOGRAPHY AND CINEMATOGRAPHY
Filed Aug. 10, 1936 2 Sheets-Sheet 2

August Persson Plahn
INVENTOR

By Peter M. Boesen
ATTORNEY

Patented Mar. 1, 1938

2,109,596

UNITED STATES PATENT OFFICE 2,109,596

LENS SYSTEM FOR COLOR PHOTOGRAPHY AND CINEMATOGRAPHY

August Persson Plahn, Brooklyn, N. Y.

Application August 10, 1936, Serial No. 95,058
In Denmark December 14, 1935

7 Claims. (Cl. 88—16.4)

This invention relates to a system of lenses for the taking of colored motion pictures, as well as ordinary color photography, and for the projection of colored pictures and colored motion pictures. Many systems and methods for the taking and projection of colored pictures are known, but these may in general be divided in two classes, viz., those using the subtractive and those using the additive process. These methods may further be classified as two, three or four color methods according to whether two, three or four primary colors are mixed to obtain the desired color spectrum. The present invention relates to a three color additive process.

Most present-day methods of colored motion pictures apply a two color subtractive process. This means, that to obtain the various shades of color, pigments of two primary colors are mixed and applied to the film. The printing of such films is very difficult and costly, and the color rendering is often very imperfect and unreal. In these processes using pigmentary mixtures light is absorbed, or subtracted, and these are therefore called subtractive. Contrary to these the present invention uses a process where a light mixture of the three primary colors, red, blue and green give the desired color effects. Light is here mixed directly or added, thus the process is called additive.

The additive process is well known and reference is made to U. S. Patent No. 1,355,498 of October 12, 1920. This process, however, while scientifically perfect has not been successful commercially due to practical and technical difficulties in the photographic and projection apparatus. The object of my present invention, therefore, is to eliminate these difficulties by getting rid of the effect of parallax in focusing three lenses on the same object. Another object of my invention is to simplify the operation of the focusing mechanism. A still further object is to provide means whereby the two outside lenses may be simultaneously adjusted to correct for parallax. Another object of my invention is to furnish means for taking pictures having a true stereoscopic effect relative to the human eye. Further objects of my invention will be evident from the following description and claims.

Figure 1:
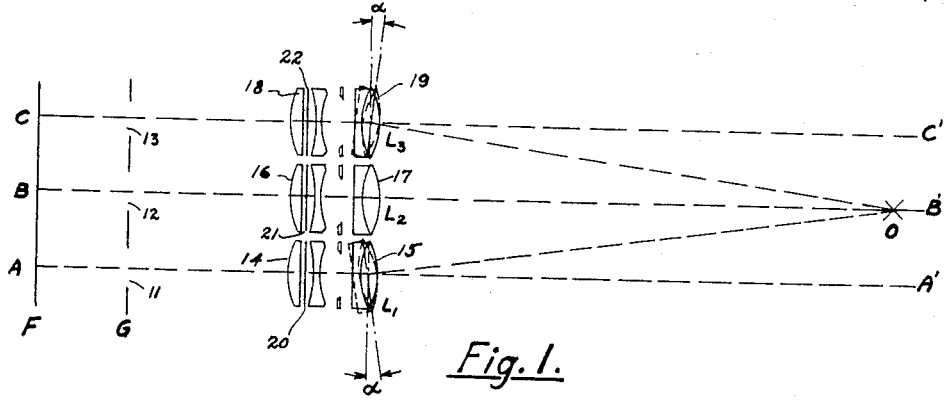
Figures 2, 3:
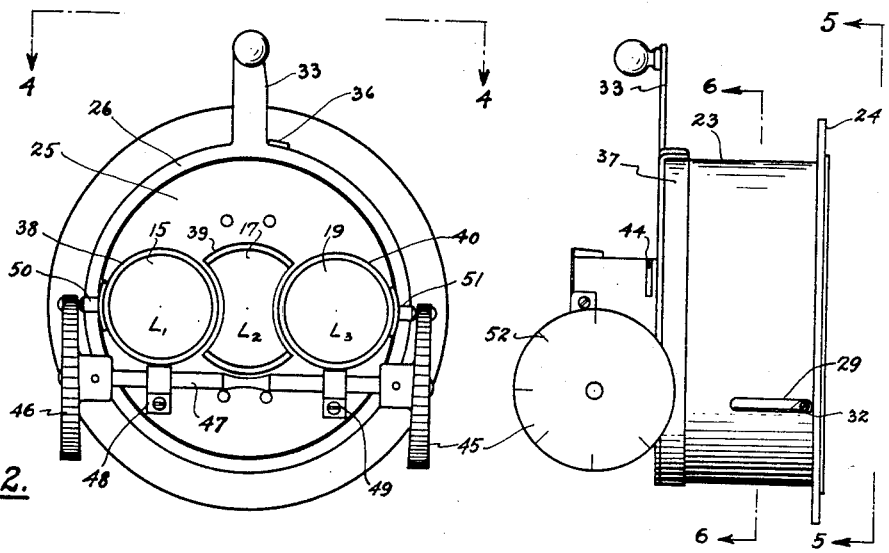
Figure 4:
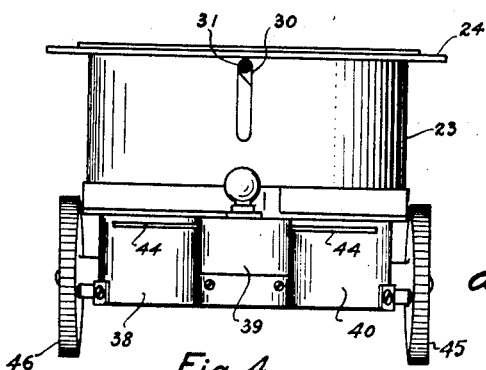
Figure 5:
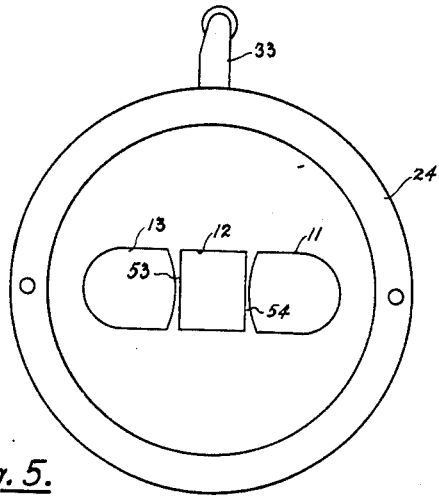
Figure 6:
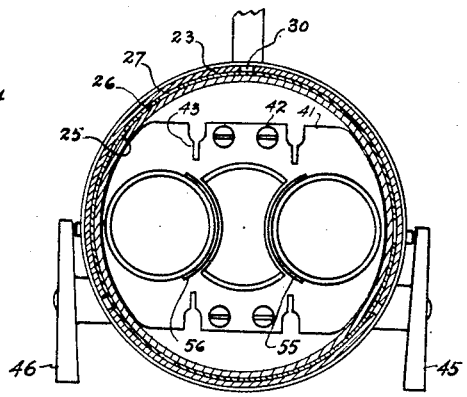
Figure 8:
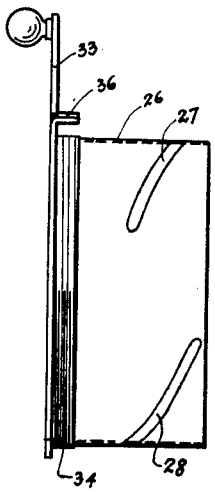
Figure 7:
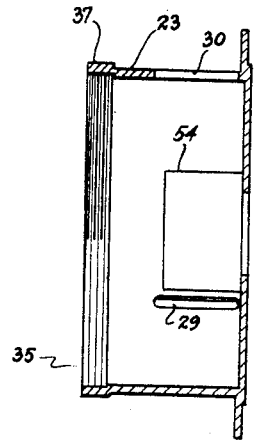

In the accompanying drawings, forming part of this specification, and in which like numerals are employed to designate like parts throughout the same, Figure 1 is a diagrammatical illustration of the optical system of the present invention, Figure 2 is a front elevation of the objective cylinder, Figure 3 is a side elevation of same, Figure 4 is a plan view along line 4—4 in Fig. 2, Figure 5 is a rear view along line 5—5 in Fig. 3, Figure 6 is a section along line 6—6 in Fig. 3, Figure 7 is a longitudinal section of the outer objective cylinder, and, Figure 8 is a side elevation of the rotatable focusing sleeve.

Referring now to Fig. 1, which shows a schematic diagram of the lenses and method used in the present invention, the three separate objectives are designated as $L_1$, $L_2$ and $L_3$. These objectives, or lens combinations, have parallel axes A—A', B—B' and C—C'. A film placed at F will receive three separate images at A, B, and C. These are furthermore separated through the gate G which has openings 11, 12 and 13. The separate objectives $L_1$, $L_2$ and $L_3$ each have a rear and a front lens, respectively, 14, 15; 16, 17 and 18, 19. While all three objectives, as will be hereinafter shown in detail, are moveable in the direction of their axes for focusing purposes, the centre objective $L_2$ and the rear lenses 14 and 18 of $L_1$ and $L_3$, respectively, are in a fixed relation to each other. The front lenses of $L_1$ and $L_3$, however, are turnable on a small angle α relative to the centre lens. If thus a small object is placed at O the lenses 15 and 19 may be adjusted in such a manner that the image of O upon the film F at A, B and C, respectively, will be in the same relative position, and thus eliminate the effects of parallax.

Red, blue and green light filters, designated respectively as 20, 21 and 22 are placed in the rear fixed part of the composite lenses. The image at A, therefore, will be predominantly fixed by the red rays, while that at B by blue rays and the one at C by green rays.

The three objectives $L_1$, $L_2$ and $L_3$ are mounted together in an objective case illustrated in Figures 2, 3 and 4 where 23 is the outer casing which has a flange 24 for mounting to a camera or projection apparatus. The three objectives are mounted in an inner, slidable cylinder 25 with a rotatable sleeve 26 filling the space between said cylinder 25 and the outside casing 23. The outside casing is separately illustrated in Fig. 7 while the sleeve 26 is illustrated in Fig. 8. As may be seen from Fig. 8 the sleeve 26 has a plurality of screw slots, 27 and 28. The outside case 23 has corresponding straight slots 29 and 30, see Figures 3, 4 and 7. Screws 31 and 32 are fastened in the slidable objective cylinder 25 with the heads extending through slots 27, 30 and 28, 29, respectively, and serve as guides and propelling means for the inner objective cylinder 25. The rotatable sleeve 26 has a handle 33 by which said sleeve may be rotated. The sleeve 26 has an outside fine thread 34 fitting into an inside thread 35 in the casing 23. When screwed all the way in this thread provides an end position and reference point from which the handle 33 may be turned away, and the thread also takes up the thrust force required to push the inside objective cylinder out and in. The sleeve 26 furthermore has a guide and index 36 sliding over the outside edge of casing 23. Index marks on the edge 37 or said casing 23 make calibration of the setting for various distances possible. By thus moving handle 33 the objective cylinder 25 will slide in an axial direction and one may quickly focus the lenses for distance.

Due to the necessity of keeping the axes of the three lenses as close together as possible the centre lens $L_2$, which is of slightly larger diameter, has been cut out in part to provide room for lenses $L_1$ and $L_3$ as shown in Fig. 2. Each of the separate objectives $L_1$, $L_2$ and $L_3$ is mounted in an individual tube, respectively, 38, 39 and 40. The rear ends of these tubes are mounted in a transverse flange 41 shown in Fig. 6. This flange 41 is again mounted by four screws 42 to the inside slidable objective cylinder 25. The flange 41 has slots 43 which permit a slight bending of same transversally to the two outside objective tubes 38 and 40. The latter also in addition have transverse saw cuts 44, as shown in Figures 3 and 4, to facilitate a slight bending. The purpose of this bending is to obtain the sharp adjustment of focus and elimination of parallax as illustrated in Fig. 1 and described above.

To obtain the above described bending of the outside objective tubes 38 and 40 to eliminate parallax it is essential that both be bent the same amount toward the axis of the centre tube. For this purpose there has been provided a unique system of two parallel and identical cams 45 and 46. These are disc shaped and mounted rotatably on the transverse shaft 47 which is held in two bearings 48 and 49 mounted on the objective cylinder 25. On the outside periphery of the tubes 38 and 40 are projecting pins 50 and 51, the outer ends of which are in contact with the inside faces of the cam discs 45 and 46. The inside faces of these cam discs are slanting relative to their axis and by turning these discs a slight motion will be transmitted to the objective tubes 38 and 40 through the pins 50 and 51. Index marks 52 may be provided on the outside faces of these cam discs thus permitting a calibration and accurate adjustment for parallax. The maximum bending of the objective tubes 38 and 40, and thus the maximum angle $\alpha$, is governed by the highest point on the cam discs in a transverse direction.

In Fig. 5 is shown a rear view of the objective case. The openings 11, 12 and 13 are those shown schematically in Fig. 1. To eliminate parallax rays there are placed shields 53 and 54 between these openings, see also Fig. 7. Similar shields 56 and 57 are fastened to the outside objective tubes as shown in Fig. 6.

The operation of my device is evident from the foregoing description. The regular focusing for distance is accomplished by turning handle 33 while fine adjustment for parallax is obtained by turning the cam discs 45 and 46. These latter are pinned to the shaft 47 so that the rotation of one automatically produces a similar rotation of the other.

It is to be understood that the form of my invention, herewith shown and described, is to be taken as a preferred example of the same, and that various changes in shape, size and arrangement of parts may be resorted to, without departing from the spirit of my invention, or the scope of the subjoined claims.

Having thus described my invention, I claim:

1. In a lens system for a three color additive method the combination of three parallel objective tubes arranged with their axes in one plane, the center tube having circular segment shaped cut-outs to bring the two outside tubes closer to the centre; three composite objectives located one in each of said objective tubes; three color filters, one red, one blue and one green, disposed one in each of said composite objectives; a slidable objective cylinder in one end of which said objective tubes are mounted with their axes parallel with the axis of the slidable objective cylinder; a lens housing surrounding said objective cylinder; means for focusing for distance by sliding said objective cylinder axially in said lens housing and transverse parallax focusing means effecting a slight convergence of the said two outside objective tubes toward the centre.

2. In a lens system for a three color additive method the combination of three parallel objective tubes arranged with their axes in one plane, the center tube having circular segment shaped cut-outs to bring the two outside tubes closer to the centre, the outside tubes having transverse slots permitting a bending of a portion of said tubes toward the centre; three composite objectives located one in each of said parallel objective tubes in such a manner that in the two outside tubes one part of said composite objective is located on either side of said transverse slots; three color filters, one red, one blue and one green, located one in each of said objective tubes; a slidable objective cylinder in one end of which said objective tubes are mounted with their axes parallel with the axis of the cylinder; a lens housing surrounding said slidable objective cylinder; means for focusing for distance by sliding said objective cylinder axially in said lens housing and transverse parallax focusing means effecting a slight convergence of the said two outside objective tubes toward the centre.

3. In a lens system for a three color additive method the combination of three parallel objective tubes arranged with their axes in one plane, the center tube having circular segment shaped cut-outs to bring the two outside tubes closer to the centre, the two outside tubes having transverse slots permitting a slight bending of a portion of said tubes toward the centre; three composite objectives located one in each of said objective tubes in such a manner that in the two outside tubes one part of each of said composite objectives is located on either side of said transverse slots; three color filters, one red, one blue and one green, located one in each of said objective tubes; a slidable objective cylinder in one end of which said objective tubes are mounted with their axes parallel with the axis of the cylinder; a lens housing surrounding said slidable objective cylinder; a flange on said lens housing with means for mounting to a camera; means for focusing for distance by sliding said objective cylinder axially in said lens housing and transverse parallax focusing means effecting a slight convergence of the said two outside objective tubes toward the centre.

4. In a lens system for a three color additive method the combination of three parallel objectives; three color filters, one red, one blue and one green, disposed one in each of said parallel objectives; a slidable objective cylinder in one end of which said parallel objectives are mounted with their axes parallel with the axis of said cylinder; a lens housing surrounding said slidable objective cylinder; a flange on the rear end of said lens housing with means for mounting to a projection apparatus; distance focusing means comprising a rotatable sleeve interposed between said slidable objective cylinder and said lens housing; removable guide pins in said slidable objective cylinder, said pins protruding through screw line slots in said rotatable sleeve and through straight longitudinal slots in said lens housing, whereby an angular displacement of said sleeve produces a corresponding axial movement of said slidable objective cylinder; and, transverse parallax focusing means effecting a slight convergence of the outside lens axes toward the centre.

5. In a lens system for a three color additive process the combination of three parallel objective tubes arranged with their axes in one plane, the center tube having circular segment shaped cut-outs to bring the two outside tubes closer to the centre, the two outside tubes having transverse slots permitting a slight bending of a portion of said tubes toward the centre; three composite objectives located one in each of said objective tubes in such a manner that in the outside tubes one part of each of said composite objectives is located on either side of said transverse slots; three color filters, one red, one blue and one green, disposed one in each of said objective tubes; a slidable objective cylinder in one end of which said objective tubes are mounted with their axes parallel with the axis of the cylinder; a lens housing surrounding said slidable objective cylinder; a flange on said lens housing with means for mounting to a camera; distance focusing means comprising a rotatable sleeve interposed between said slidable objective cylinder and said lens housing; removable guide pins in said slidable objective cylinder, said pins protruding outwardly through screw line slots in said rotatable sleeve and through straight longitudinal slots in said lens housing, whereby an angular displacement of said sleeve produces a corresponding axial movement of said slidable objective cylinder; transverse parallax focusing means comprising a rotatable shaft mounted transversally on the front of said slidable objective cylinder, two disc type axial cams mounted one on each end of said rotatable shaft and adjacent to the sides of the front ends of said outside objective tubes, projections on the sides of said two outside objective tubes engageable with said axial cams whereby a rotation of said cams produces an inward convergence of said two outside objective tubes.

6. In a lens system for color photography and cinematography such as described in claim 5 where said rotatable sleeve has a fine thread at one end engageable with a similar female thread in said lens housing, a handle disposed on the outside end of said rotatable sleeve, an index finger adjacent to said handle projecting over the outside edge of said lens housing and index marks on said lens housing indicating the correct focusing for distance of said lens system.

7. A lens system for color photography and cinematography such as described in claim 5 comprising shields located on the inside rear ends of said two outside objective tubes, shields extending forwardly from the rear wall of said lens housing, said rear wall of said lens housing having three gates, one for each of said composite objectives and said forwardly extending shields being located between each two of said gates, and index marks on the outside faces of said disc type axial cams for accurate adjustment and elimination of parallax.

AUGUST PERSSON PLAHN.